INVENTOR
Dow A. Rogers, Jr.

3,586,557
MICACEOUS INSULATION AND ELECTRICAL
APPARATUS INSULATED THEREWITH
Dow A. Rogers, Jr., Pittsburgh, Pa., assignor to Westinghouse Electric Corporation, Pittsburgh, Pa.
Filed Jan. 8, 1968, Ser. No. 700,339
Int. Cl. B32b 31/14
U.S. Cl. 156—85          12 Claims

ABSTRACT OF THE DISCLOSURE

A thin solid thermoplastic binder sheet is sandwiched between a sheet of micaceous insulation and a fibrous substrate or backing sheet such as polyester fiber webbing or glass fiber cloth. The composite is heated and pressed together. The thermoplastic binder sheet softens and bonds the fibers of the backing to the mica sheet. The thermoplastic sheet also shrinks so that film discontinuities are formed in areas between the fibers of the backing. The resulting composite insulation has excellent physical and electrical properties and is permeable to liquid insulating varnishes or resins.

BACKGROUND OF THE INVENTION

This invention relates to a new type of flexible micaceous insulation and to methods of manufacturing it.

Mica insulation has been heretofore prepared in a variety of ways. One method used only mica flakes and resinous liquid binders. This then could be cured to solidify the binder. If a flexible mica insulation were desired, a binder was chosen which upon curing would be soft or rubbery. Composites were also made with a pliable sheet backing and a resinous binder to unite the mica and backing sheet. In some instances fugitive binders such as water were used in the composite insulation, but such temporary binders did not contribute any strength and the insulation had to be handled with great care. Today with rare exceptions liquid resinous polymers are used as binders.

Recently mica paper has been used in a variety of ways as electric coil insulation. It is cheaper and more porous than are mica flakes but it suffers in mechanical and some electrical properties. Mica paper has generally been used in the art with pliable sheet backing and liquid resinous polymeric binders. One product has a thermoplastic fiber and glass fiber composite thread bonded to the mica paper at spaced intervals to add strength to the insulation. Other mica paper products have been reinforced internally with polyester fibers. There are some disadvantages with each of these prior methods, however.

The varieties which employ fugitive binders are fragile and have to be handled with care. The same is substantially true of the internally reinforced mica paper and the spaced, composite glass and thermoplastic thread reinforced mica paper. The former presents additional problems of lower electric strength and voltage endurance because the inclusion of the polyester fibers within the mica paper forces a reduction in the percentage of mica present. The other products previously employed hamper in various ways the effectiveness of the insulation.

In order to secure high efficiency and high ground insulation quality in electrical coils, it has been customary to wrap them to a predetermined thickness with composite mica insulation and then impregnate the insulated coil with a varnish or resin. The impregnating resin is applied to the coil by a treatment in which the complete coil is subjected to a vacuum. This removes moisture, gases and other deleterious volatile material from the coil and the resin is then applied, often under pressure, in order to assure penetration to the innermost interstices of the coil.

Tests have shown that cured resinous mica binders that unite the mica flakes or mica paper and the pliable sheet backing hinder the penetration of any varnish impregnant. These cured resinous binders used in the insulation of coils, electrical conductors and electrical machine windings also present problems in terms of useful life of the mica composition before application.

The variety of problems in this field and especially the problem of combining strength with permeability in mica insulation have been solved by the novel invention hereinafter described.

SUMMARY

It is the general object of this invention to provide a new and improved flexible micaceous insulation which has the advantages of excellent electrical properties, indefinite shelf life, increased resistance to delamination, higher tensile strength, superior permeability and complete compatibility with all presently known impregnating varnishes and/or resins.

Another object of this invention is to provide new and improved methods of fabricating flexible micaceous insulation and methods for continuously producing such micaceous insulation.

Briefly, the present invention accomplishes the above cited objects by bonding mica paper to a strong fibrous backing by means of a thin sheet of a thermoplastic resin. The thin solid thermoplastic film is sandwiched between the mica paper and the backing. The composite is heated to soften the thermoplastic film, thereby bonding the elements of the composite together and contracting the thin thermoplastic film toward fibers of the backing, leaving irregular voids through which an impregnating varnish can penetrate.

The thermoplastic binder sheet, which is conveniently available commercially in rolls, provides a composite with an excellent bond and peel strength, while maintaining a high degree of permeability in the insulation. The use of a fibrous substrate backing such as polyester webbing or open weave glass cloth results in a very flexible insulation with high tensile strength that can take the rough treatment associated with coil manufacture.

BRIEF DESCRIPTION OF THE DRAWINGS

Further objects and advantages of the invention will become apparent as the following description proceeds and features of novelty which characterize the invention will be pointed out in particularity in the claims annexed to and forming a part of this specification.

For a better understanding of the invention reference may be had to the accompanying drawings, in which.

DESCRIPTION OF THE PREFERRED EMBODIMENTS

Figure 1:
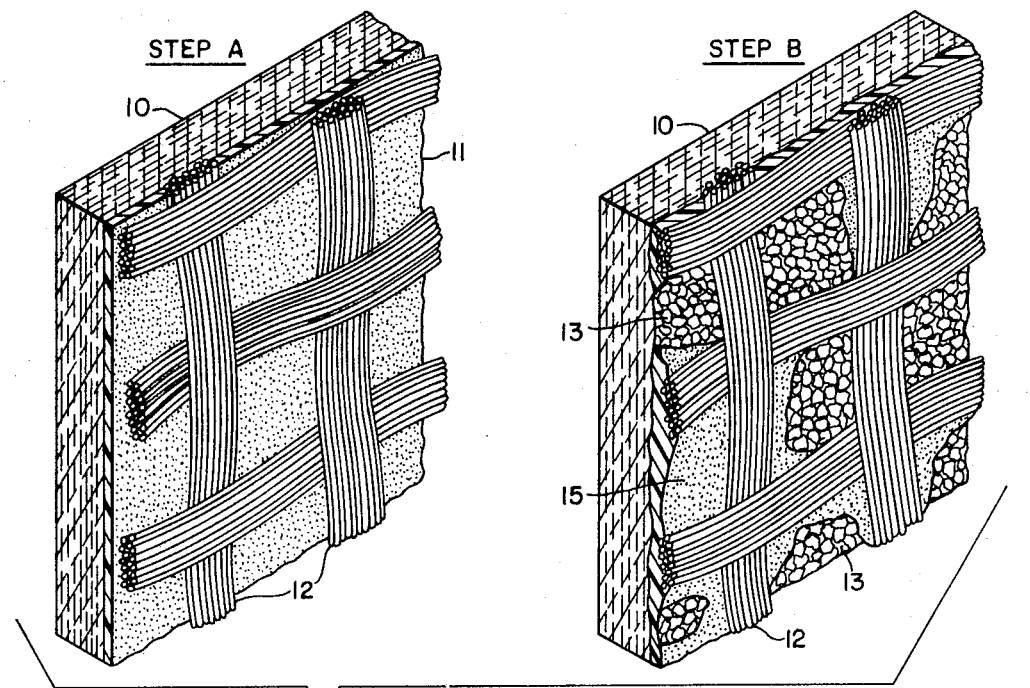
FIG. 1 is an enlarged fragmentary perspective view of the composite in two stages of preparation.

It has now been discovered that a micaceous sheet and a fibrous reinforcement or substrate may be bonded together by disposing a sheet of a thin thermoplastic film between the micaceous sheet and substrate and then heating the composite to at least soften and partially fuse the thermoplastic film. The thin thermoplastic film shrinks during the bonding process and the discontinuities, formed because of the shrinkage, make the composite permeable to resin impregnating varnishes. This insulation has excellent electrical properties, infinite shelf life, superior flexibility, high tensile strength, and, most unexpectedly, excellent permeability and complete compatibility with all known impregnating varnishes.

Mica paper is taking on an increasingly important role as insulation for electrical apparatus. In addition to offering a substantial cost advantage, long term tests have shown mica paper composite insulation to be superior to mica splitting insulation with regard to lower dissipation factors, as a function of both temperature and voltage, electric strength, and voltage endurance in low voltage (less than 7 kv.) systems. There is mounting evidence that this superiority may also be true in high voltage (7 kv. to 13.8 kv.) systems. Until recently, with the advent of new raw mica paper structures, it was the lack of sufficient voltage endurance which made mica paper unacceptable for application on high voltage electrical apparatus.

Porous mica paper suitable for use in the present insulation is produced commercially in continuous uniform flexible ribbons or sheets and can be manufactured by known processes, for example, as described in U.S. Pat. No. 2,791,262. Mica paper commonly has a dielectric strength of about 600 volts per mil or more, a tensile strength of about 2000 p.s.i., and a thickness variation of as little as 10%. The cohesive forces that hold the mica paper together are those between parallel faces of the similarly oriented miniature mica flakes in the mica paper. An obvious disadvantage of its use alone as an insulation is its poor tensile and tear strength.

Among the reinforcements or backings that can be used in conjunction with the mica paper to add strength to the composite insulation are kraft paper, asbestos, fiberglass products such as glass paper and open weave glass cloth and polyacrylate and polyester webs. The backings must have strength, flexibility, be of a fibrous or woven nature and be able to withstand a moderate bonding temperature.

Suitable solid thermoplastic self-supporting films or sheets that may be employed to provide the film bond are films of polyamide, polyester, polyethylene, polypropylene, polymeric fluorinated ethylene, polystyrene, polyvinyl alcohol, polyvinyl chloride, polyvinyl fluoride, regenerated cellulose (cellophane), polycarbonate, polymeric phenoxy, polysulfone, and the ionic $\alpha$-olefin-acid resins.

The films of ionic $\alpha$-olefin-acid copolymers give excellent results. They are described in the September 1964 issue of Modern Plastics, pages 98 and 209 and are available under the proprietary name Surlyn from E. I. du Pont. This polymer utilizes both covalent and ionic bonds. The ionic bonds in the polymer produce thermally reversible interchain linkages through a variety of cations usually derived from Group I and II metals. The negatively charged groups, or anions are usually carboxyl groups pendant from the main chains. The major component is usually ethylene. Further properties are also given in 44 Modern Plastics Encyclopedia (1967), page 177.

The ionic $\alpha$-olefin-acid copolymers are copolymers of an $\alpha$-olefin, having the general formula $RCH=CH_2$, such as ethylene, and a $\alpha,\beta$-ethylenically unsaturated monocarboxylic acid, such as methacrylic acid, and having metal ions with an ionized valence of 1 to 3, such as sodium, zinc, and iron uniformly distributed throughout. Other monomers may be optionally copolymerized with the foregoing copolymers. Reference may be made to U.S. Pats. Nos. 3,264,272 and 3,338,739 for details on the preparation of such ionic copolymers and on the preparation of films, including coated films, from such copolymers.

The solid thermoplastic sheets used *should* be heat shrinkable, i.e., have the property of contracting in one or both directions when subjected to temperatures of over 100° C. under substantially no tension. The most desirable thermoplastic sheets are extruded in manufacture and also are biaxially oriented. A thermoplastic film is biaxially oriented when, during manufacture, the sheet is stretched in two direction at right angles to each other, either simultaneously or consecutively. Both biaxial orientation and heat shrinkage are discussed and described in U.S. Pats. Nos. 3,177,277 and 2,928,132. Generally, the level of heat shrinkage are discussed and described in U.S. Pats. Nos. 3,177,277 and 2,928,132. Generally, the level of heat shrinkage is controlled in part by the temperature at which the thermoplastic sheet is heat set. Heat setting causes such sheets to crystallize by heating them to a temperature considerably above that at which they were stretched during manufacture. A sheet when heat set at elevated temperatures exhibits a high degree of dimensional stability and resistance to shrinkage. Therefore, the thermoplastic sheets used in the invention should not be heat set, or should be heat set at a low temperature. The less heat shrinkage in the thermoplastic sheet or film used in the insulating composite, the less permeability in the final product. So too a biaxially oriented sheet will tend to shrink equally in both directions toward the fibers of the substrate in the insulation composite with resulting improved permeability. The thickness of the solid thermoplastic sheets is extremely important with a desirable range from about 0.12 to about 0.85 mil. Below about 0.12 mil the sheet becomes too difficult to handle and above about 0.85 mil the sheet takes a prolonged time to soften and forms voids for a continuous process. The preferred thickness range is from about 0.25 to about 0.50 mil.

Referring now to FIG. 1, step A shows the mica paper layer 10, the solid sandwiched heat shrinkable thermoplastic sheet 11 and one type of backing 12 *before heating*. Step B shows the micaceous insulation composite *after heating*. Here the mica paper 10 is completely open to impregnation at voids 13 which occur at most points between the fibers of the backing 12. The heat shrinkable thermoplastic sheet has contracted towards the fibers of the backing in most places resulting in an irregularly perforated non-continuous film 15 similar to that shown. Various other types of fibrous backings or reinforcements can be used with the same results. FIG. 1 is only illustrative of a woven web type.

Figure 2:
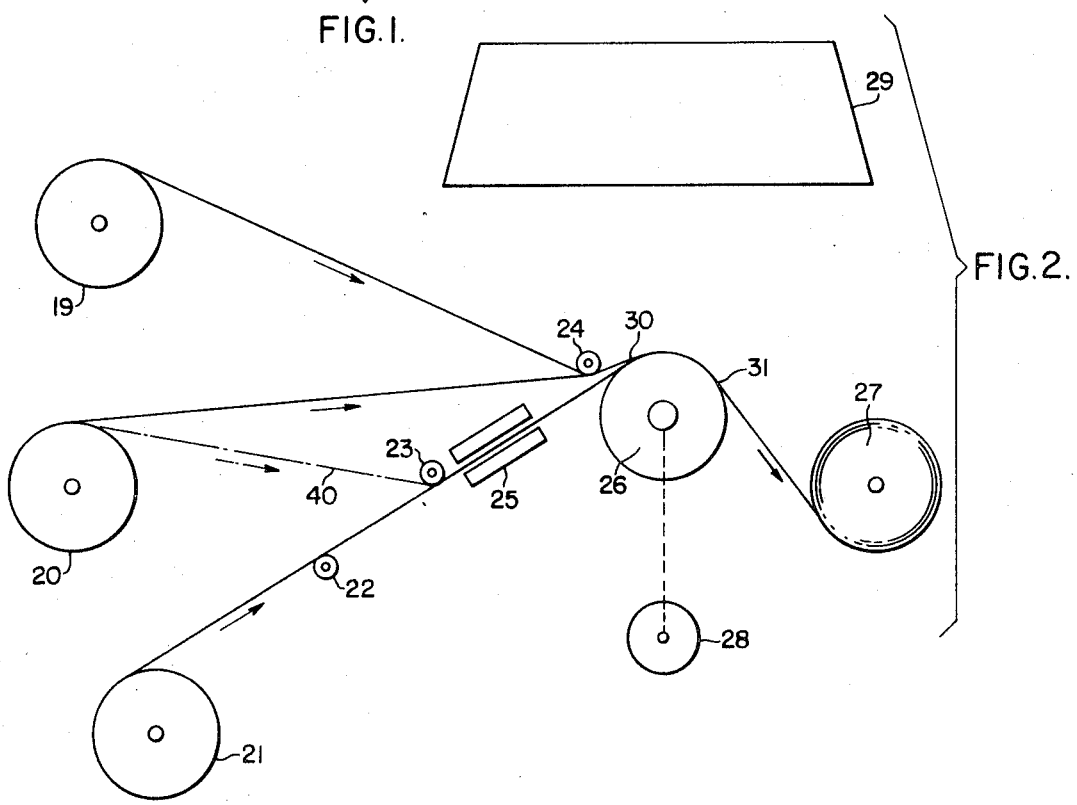
FIG. 2 is a schematic elevation illustrating the continuous preparation of micaceous insulation in accordance with this invention.

FIG. 2 illustrates a method of continuously manufacturing micaceous insulation in accordance with this invention. Backing, generally 1 or 2 mils thick is continuously paid off reel 19. A solid thermoplastic sheet is continuously paid off reel 20. Mica paper, generally 2 or 3 mils thick is continuously paid off reel 21 over rollers 22, 23 into a pre-heater 25 at a temperature of about 100° C. to drive off any moisture in the mica paper. The backing and thermoplastic sheet meet at contact roller 24. The backing, thermoplastic sheet and mica paper join at point 30 where they come into contact with heated roller 26 chain driven by motor 28. The reels 19, 20 and 21 are tension driven only. The maximum speed, in this case, is about 30 feet per minute. The temperature of the heated roller 26 will vary generally between 100° and 300° C. depending on the materials used. If a sheet of thermoplastic polyester such as polyethylene terephthalate is used, then a backing with a higher melting point such as open weave glass cloth must be used. With this combination there will be a temperature gradient of about 50° C. between the heated roller at about 300° C. and the glass cloth backing at about 250° C. If a lower melting solid thermoplastic such as polypropylene, an ionic $\alpha$-olefin-acid copolymer, or polyethylene, is used, the heated roller will be at about 230° C. with about a 50° C. temperature gradient to the fibrous backing which in this case may be a web of polyethylene terephthalate fibers. The total contact with the heated roller between points 30 and 31 is about 8 inches and the bonding will generally be completed in the first 4 inches of contact. Mica paper is used at the bottom so that the heated roller is not contaminated by melted thermoplastic. A vent hood 29 is used throughout the process to remove volatiles and a constant tension winder 27 is used as a take up reel. A pressure or pinch roll need not be used since sufficient pressure is generated at the top of heated roller 26 for adequate bonding from the reel tensions.

It should be noted that as a modification the thermoplastic sheet could be spot bonded to the mica paper in oven 25 by leading the sheet along the dotted line 40 as shown. Also the thermoplastic sheet coud be bonded to the mica paper first, using a heated roller and that composite bonded to the substrate backing using a second heated roller. The thermoplastic sheet could also be bonded to either the mica paper or fibrous substrate in a separate step, that composite then being employed in the foregoing process.

EXAMPLE I

A laminate, in this case a flexible composite, was prepared from a 0.002 inch thick mica paper, 0.0025 inch thick polyethylene terephthalate bonding sheet and a 0.0017 inch thick open weave glass cloth backing. The composite, with the bonding sheet sandwiched between the mica paper and glass cloth, was placed in a press and heated at 260° C. for 5 minutes at a pressure of 200 p.s.i. The resulting laminate was extremely well bonded (any attempt to remove the glass cloth backing resulted in destruction of the mica paper) and showed excellent tensile strength (11,500 p.s.i.) and flexibility.

Microscopic examination indicated that each glass filament bundle was firmly bonded to the mica paper and that the interstices, in this case the spaces within the woven structure, were essentially void of film. To further prove that a high degree of permeability was achieved in the composite laminate, a necessary condition for subsequent impregnation, a drop of styrene was placed on the surface of the laminate. Penetration of the liquid was immediate and the opposing surface layer was thoroughly wetted by the styrene. This phenomenon, associated with thermoplastic sheets, is due to their initial orientation as manufactured. When the sheet is exposed to 260° C. and 200 p.s.i., it simply shrinks away from the weave openings of the glass cloth and the resulting structure is completely permeable. The resulting product appears to be ideally suited to high speed strand taping of rectangular copper wire.

EXAMPLE II

A laminate was prepared from a 0.003 inch thick mica paper, 0.0003 inch thick sheet of sodium acrylated polyethylene, an ionic α-olefin-acid copolymer film, commercially available under the proprietary name Surylin A (E. I. du Pont), and a 0.0012 inch thick web of polyethylene terephthalate fibers. The composite was placed in a press and heated at 180° C. for 2 minutes at a pressure of 200 p.s.i. The resulting laminate was extremely well bonded and showed excellent tensile strength (9,700 p.s.i.), flexibility, and permeability. The resulting product appears to be ideally suited as a low cost ground insulation for motors and generators.

EXAMPLE III

A laminate was prepared from, respectively, a 0.0012 inch thick polyethylene terephthalate web, a 0.0003 inch thick sheet of sodium acrylated polyethylene, 0.003 inch thick mica paper, a second .0003 inch thick sheet of sodium acrylated polyethlyene, and a second 0.0012 inch thick polyethylene terephthalate web. The composite was placed in a press and heated at 180° C. for 2 minutes at a pressure of 200 p.s.i. The resulting laminate was very well bonded and showed excellent tensile strength (11,500 p.s.i.), flexibility and permeability. This product is an example of double backed mica paper tape using polyester web as a reinforcement.

EXAMPLE IV

A laminate was prepared from a 0.0017 inch thick open weave glass cloth, a 0.00025 inch polyethylene terephthalate sheet, a 0.003 inch thick mica paper, a 0.00025 inch thick polyethylene terephthalate sheet and a 0.0017 inch thick open weave glass cloth. The composite was placed in a press and heated at 260° C. for 5 minutes at a pressure of 200 p.s.i. The resulting laminate was extremely well bonded and showed excellent tensile strength (15,000 p.s.i.), flexibility and good permeability.

EXAMPLE V

A laminate was prepared from a 0.0012 inch thick polyethylene terephthalate web, a 0.0003 inch thick sheet of sodium acrylated polyethylene, a 0.003 inch thick sheet of mica paper and a second 0.0003 inch thick sheet of sodium acrylated polyethylene. The composite was placed in a press and heated at 180° C. for 2 minutes at a pressure of 200 p.s.i. The resulting product is an example of strength single backed tape or wrapper.

Where open weave glass cloth is used as the reinforcement any heat shrinkable thermoplastic sheets may be empolyed as the binder. Where a polyethylene terephthalate web backing is used, heat shrinkable thermoplastic sheets with softening or melting points below 240° C. must be used so that the temperature necessary to soften the thermoplastic binder film does not soften and/or destroy the backing reinforcement.

EXAMPLE VI

A laminate was also prepared using a continuous process in the apparatus illustrated in FIG. 2. The set up used three feeding reels shown in FIG. 2. The top reel held a roll of 0.002 inch thick mica paper. The middle reel held a roll of 0.00025 inch thick polyethylene terephthalate film and the bottom reel held a roll of 0.0017 inch thick open weave glass cloth. The mica paper was paired off of the reel and passed through a small heater at a temperature of about 100° C. to drive off moisture. The mica paper was then passed over the top of a chain driven heated roller. The polyethylene terephthalate film and the glass backing were also directed over the roller, respectively superimposed over the mica paper. The speed of the roller was about 20 ft./min. and the surface contact of the roller with the composite was 8 inches. The temperature at the surface of the roller was 300° C. while the temperature at the glass cloth backing was about 50° C. less. The resulting bonded micaceous insulation was then taken up on another roller.

No pressure was applied in the process other than the tension on the sheets between the feeding reels and the heated roller. The resultant insulation was well bonded and showed excellent tensile strength (11,000 p.s.i.) and flexibility. Its permeability was also very good. Microscopic examination indicated good bonding. Although somewhat difficult to observe, the spaces within the woven structure were not completely void of film. The film appeared to remain in a few open areas to give what might be described as a "swiss cheese" appearance. Some spaces within the woven structure were completely covered by the film but the vast majority of the spaces were either completely open or partially open in various degrees. Although the continuous process does not give the complete permeability achieved when a press is used it does, however, produce an extremely permeable, flexible and very strong insulation. The degree of permeability is, of course, sufficient for thorough resin penetration of multiple layers of the insulation.

While there have been shown and described what are at present considered to be the preferred embodiments of this invention, modifications thereto will readily occur to those skilled in the art. It is not desired, therefore, that the invention be limited to the specific arrangements, embodiments and methods shown and described and it is intended to cover in the appended claims all such modifications as fall within the true spirit and scope of the invention.

I claim as my invention:

1. A method of producing a strong, varnish permeable, flexible, micaceous insulation from a sheet of micaceous material and a fibrous reinforcing substrate comprising the steps of disposing a thin, solid, heat shrinkable, biaxially oriented thermoplastic film between said micaceous sheet and substrate to form a composite and heating the composite to cause the thermoplastic film to bond the micaceous sheet to the substrate and to shrink the thermoplastic film sufficiently to form voids therein between the fibers of the reinforcing substrate, providing open micaceous surface areas.

2. The method of claim 1 wherein the thermoplastic film has a thickness from about 0.125 mil to about 0.85 mil.

3. The method of claim 1 wherein the thermoplastic film is a film of a resin selected from the group consisting of polyamide, polyester, polyethylene, polypropylene, fluorinated ethylene, polystyrene, polyvinyl alcohol, polyvinyl chloride, polyvinyl fluoride, regenerated cellulose, polycarbonate, phenoxy, polysulfone and ionic α-olefin-acid copolymer resins.

4. The method of claim 3 wherein the substrate is a sheet of fibers selected from the group consisting of kraft paper, asbestos, glass, and polyester fibers.

5. The method of claim 4 wherein the thermoplastic film is a film of polyethylene terephthalate and the substrate is open weave glass cloth.

6. The method of claim 4 wherein the thermoplastic film is a film of sodium acrylated polyethylene and the substrate is web of polyethylene terephthalate fibers.

7. A method of producing a strong, varnish permeable, flexible, micaceous insulation from a sheet of micaceous material and a fibrous reinforcing substrate comprising the steps of disposing a solid, heat shrinkable, biaxially oriented thermoplastic film having a thickness from about 0.125 mil to about 0.85 mil, between said micaceous sheet and substrate to form a composite and heating the composite by continuously passing it over a single roll heated to a temperature of between about 100 to 300° C., so that the sheet of micaceous material contacts the heated roll, to cause the thermoplastic film to bond the micaceous sheet to the substrate and to shrink the thermoplastic film sufficiently to form voids therein between the fibers of the reinforcing substrate, providing open micaceous surface areas.

8. The method of claim 7 wherein the thermoplastic film has a thickness from about 0.25 to about 0.50 mil and is a film of a resin selected from the group consisting of polyamide, polyester, polyethylene, polypropylene, fluorinated ethylene, polystyrene, polyvinyl alcohol, polyvinyl chloride, polyvinyl fluoride, regenerated cellulose, polycarbonate, phenoxy, polysulfone and ionic α-olefin-acid copolymer resins, the substrate is a sheet of fibers selected from the group consisting of kraft paper, asbestos, glass, polyacrylate and polyester fibers, and the micaceous material is mica paper.

9. The method of claim 8 wherein the thermoplastic film is a film of polyethylene terephthalate and the substrate is open weave glass cloth.

10. The method of claim 8 wherein the thermoplastic film is a film of sodium acrylated polyethylene and the substrate is a web of polyethylene terephthalate fibers.

11. The method of claim 4 wherein said composite is heated by passing over a heated roll.

12. The method of claim 7 wherein the sheet of micaceous material is heated before making contact with the heated roll.

References Cited

UNITED STATES PATENTS

| | | | |
|---|---|---|---|
| 2,224,523 | 12/1940 | Runyan | 161—171 |
| 2,319,780 | 5/1943 | Pellett | 161—171 |
| 2,763,315 | 9/1956 | Berberich et al. | 161—208X |
| 2,784,763 | 3/1957 | Shorts | 156—85 |
| 3,095,315 | 6/1963 | Magill, Jr., et al. | 156—84 |
| 3,156,926 | 11/1964 | Hoffman et al. | 156—85X |
| 3,168,434 | 2/1965 | Heyman | 161—171X |

FOREIGN PATENTS

| | | | |
|---|---|---|---|
| 258,257 | 12/1960 | Australia | 156—84 |

BENJAMIN R. PADGETT, Primary Examiner

S. HELLMAN, Assistant Examiner

U.S. Cl. X.R.

156—183; 161—171